UNITED STATES PATENT OFFICE.

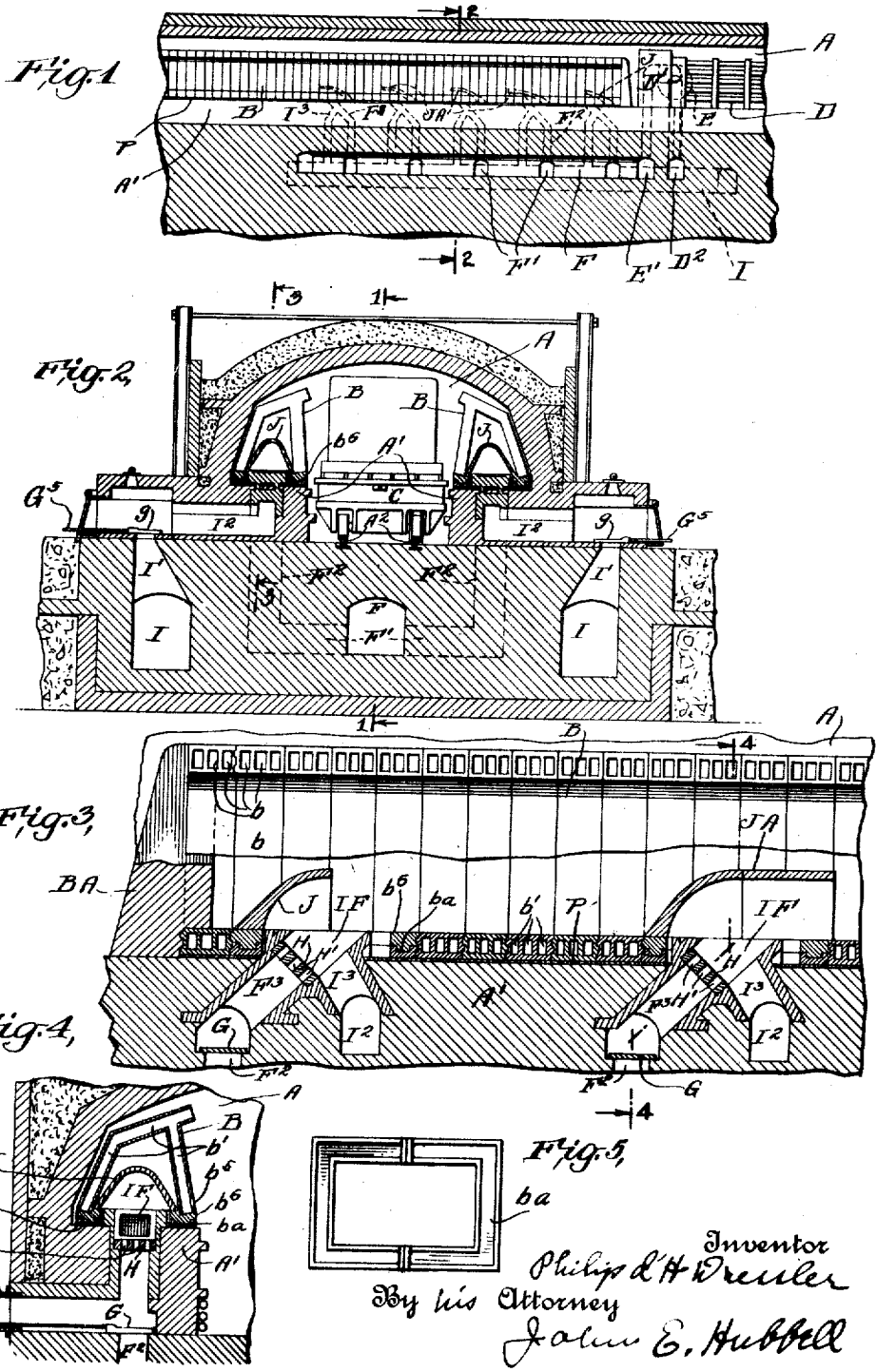

PHILIP D'H. DRESSLER, OF ZANESVILLE, OHIO, ASSIGNOR TO AMERICAN DRESSLER TUNNEL KILNS, INC., OF NEW YORK, N. Y., A CORPORATION OF NEW YORK.

BURNER FOR TUNNEL-KILNS.

1,385,986.     Specification of Letters Patent.     Patented Aug. 2, 1921.

Application filed May 1, 1920. Serial No. 378,331.

*To all whom it may concern:*

Be it known that I, PHILIP D'H. DRESSLER, a subject of the King of Great Britain, and resident of Zanesville, in the county of Muskingum and State of Ohio, have invented certain new and useful Improvements in Burners for Tunnel-Kilns, of which the following is a specification.

My present invention relates to improvements in tunnel kilns of the internal combustion type, and consists in improved means for supplying gas and air for its combustion, to the combustion chambers of the kiln, and was devised with the general object in view of providing a relatively simple and durable construction for supplying gas and air in such manner as to maintain efficient combustion conditions.

The various features of novelty which characterize my invention are pointed out with particularity in the claims annexed to and forming a part of this specification. For a better understanding of the invention, however, and the advantages possessed by it reference should be had to the accompanying drawings and descriptive matter in which I have illustrated and described a preferred embodiment of my invention.

Of the drawings:

Figure 1 is a somewhat diagrammatic elevation of a portion of a tunnel kiln, in section on the line 1—1 of Fig. 2;

Fig. 2 is a transverse section on line 2—2 of Fig. 1;

Fig. 3 is a partial section on line 3—3 of Fig. 2;

Fig. 4 is a partial section taken on the broken line 4—4 of Fig. 3; and

Fig. 5 is a plan view of a part.

In the drawings A represents the chamber of a continuous tunnel kiln of the well-known Dressler type. The kiln heating means comprises combustion chambers B which rest on benches or ledges A' at the opposite sides of the track rails A² for the cars C which transport the goods to be heated through the kiln. The combustion chambers B are elongated. The walls of the combustion chamber are formed of hollow tile $b$ except for special bottom wall sections $ba$ provided at each burner station. As shown there are several burner stations for each combustion chamber, though there need be but one in some cases. The hollow tile sections $b$ extend transversely to the length of the combustion chamber and are formed with open ended longitudinal ventilating channels $b'$ through which the kiln atmosphere circulates. Except at the burner station portions of the combustion chamber, the channels $b'$ in the side walls of the combustion chamber open into the adjacent channels $b'$ in the top and bottom walls of the combustion chambers; the channels $b$ in the last mentioned walls open at their ends to the kiln chamber. The tile sections $b$ forming the side walls of the combustion chambers at each burner station are supported on the corresponding bottom wall section $ba$, which closes the lower ends of the channels $b'$ in the side wall tile so supported. To permit of a circulation of the kiln atmosphere through these channels, ports $b^6$ are formed in the outer walls of the channels adjacent their lower ends. Each bottom section $ba$ is in the form of an open rectangular frame which rests upon the corresponding bench A'. The sections $ba$ may be formed of blocks of fire clay or like material, but as shown each section comprises a metallic bottom frame member with refractory material $b^5$ protecting the metallic frame against the high temperature in the combustion chamber and also forming supports for the tile section $b$ forming the adjacent side walls of the combustion chamber.

At each burner station, air and gas is supplied to the corresponding combustion chamber from a mixing chamber IF, the upper end of which is open and in communication with the combustion chamber through the corresponding open bottom section $ba$ which surrounds the mixing chamber IF. As shown each chamber IF has refractory walls built into the bench, and receives air from an inlet passage F³ and combustible gas from a passage I³. Between the passage F³ and the chamber IF is placed a plate H of refractory material formed with a plurality of orifices H'. The air passing through the orifices H' into the chamber IF with a plurality of small streams incline from the vertical toward the horizontal in the direction in which the products of combustion pass lengthwise of the kiln through the combustion chamber.

To allow for expansion and contraction of the parts the combustion chambers are not secured to the benches A' along their length though they may be anchored to the benches, their ends adjacent the end walls. To permit the combustion chambers to move along the benches as they expand and contract a bed P of sand or the like is interposed between each bench and the combustion chamber supported by it. By thus sand seating the combustion chambers leakage is also avoided at the burner stations.

The passage I³ is transverse in direction to the passage F³ and to the jets of air discharged through the orifices H'. This subdivision of the air and the transverse supply of the combustible gas tends to a rapid and thorough mixture and combustion of the air and gas, so that combustion normally begins practically as the air and gas pass from the chamber IF into the combustion chamber proper. The air and gas thus passing into each mixing chamber IF is so thoroughly admixed that no difficulty from carbon deposition need be feared even though the air be quite highly preheated before its discharge into the mixing chambers. A refractory hood J extends over the rear portion of the open end of each chamber IF, resting on the upper side of the rear portion and adjacent the side portions of the open frame ba. This shield prevents the entering air and gas from impinging against the top and side walls of the combustion chambers with resultant local overheating and carbon deposition, and deflects the stream of burning gases horizontally into the combustion chamber. Advantageously each of the shields J except the one at the rear end of each combustion chamber, are provided with extensions JA projecting forward over the corresponding chamber IF and serving to separate the air and gas mixture admitted at the corresponding burner inlet from immediate admixture with products of combustion and burning gases from burner inlets at the rear.

In the particular kiln structure shown, the various gas passages I³ are connected through individual cross passages I² and vertical passages I' to the corresponding one of a pair of gas supply passages I which run lengthwise of the kiln at the sides of the latter. A damper g is provided at the upper end of each passage I' to regulate the corresponding gas flow therethrough. Each of the air supply passages F³ is connected by a corresponding vertical passage F² and horizontal passage F' to a common air supply tunnel F located beneath the pathway for the cars C and extending lengthwise of the kiln. The tunnel F receives preheated air under pressure from the outlet of a fan or blower E which has its inlet connected to a duct D² into which air is drawn by the fan suction from the headers D' for the cooling pipes D in the cooling zone of the kiln. The supply of air to each air passage F³ is regulated by a corresponding damper G. The dampers G as well as the dampers g are provided with operating handles G⁵ extending to the exterior of the kiln.

It will be apparent to those skilled in the art that with the described construction, gas and preheated air for its combustion may be supplied in precisely regulated amounts to each burner inlet of each combustion chamber. The means employed for mixing the air and gas and directing it into the combustion chamber at each burner inlet with the proper direction of flow are simple in construction and durable notwithstanding the high temperatures to which they are subjected. The relative expansion and contraction of the parts which ordinarily results in practice in a longitudinal movement of the combustion chambers relative to the benches A' on which they rest may occur without prejudicial effect on the burner construction, since each burner inlet frame ba is made with the length of the opening therein great enough to permit all reasonable relative movement of this character without injurious contact with the wall of the chamber IF.

While, in accordance with the provisions of the statutes I have illustrated and described the best form of my invention now known to me, it will be apparent to those skilled in the art that changes may be made in the form of the apparatus disclosed herein without departing from the spirit of my invention, and that certain features of my invention may sometimes be used to advantage without a corresponding use of other features.

Having now described my invention, what I claim as new and desire to secure by Letters Patent, is:

1. In a continuous tunnel kiln, the combination with an elongated kiln chamber, of an elongated combustion chamber therein formed with an aperture in its bottom wall, a masonry bench supporting said combustion chamber and formed with air and gas supply channels which open through the top surface of the bench into said aperture.

2. In a continuous tunnel kiln, the combination with an elongated kiln chamber, of an elongated combustion chamber therein formed with an aperture in its bottom wall, a masonry bench supporting said combustion chamber and formed with air and gas supply channels which open through the top surface of the bench into said aperture, and a layer of sand interposed between said bench and combustion chamber, which facilitates their relative movements resulting from temperature changes and restricts leakage through the joint between the bench and combustion chamber at the margin of said aperture.

3. A continuous tunnel kiln comprising in combination an elongated kiln chamber with a masonry platform therein formed with an air and gas mixing chamber open at its upper side and with air and gas channels opening into said mixing chamber and an elongated combustion chamber resting on said platform and formed with an opening in its bottom wall through which the corresponding mixing chamber communicates with the interior of the combustion chamber.

4. A continuous tunnel kiln comprising in combination an elongated kiln chamber with a masonry platform therein formed with a mixing chamber open at the top of the platform and with air and gas supply channels opening into said mixing chamber at an angle to one another and a combustion chamber resting on said platform and formed with an opening in its bottom wall through which said mixing chamber communicate with the interior of the combustion chamber.

5. A continuous tunnel kiln comprising in combination an elongated kiln chamber with a masonry platform therein formed with a mixing chamber open at the top of the platform and air and gas supply channels opening into said mixing chamber at an angle to one another and a perforated plate extending across one of said channels to divide the fluid flowing from that channel into the mixing chamber into a plurality of jet like streams and a combustion chamber resting on said platform and formed with an opening in its bottom wall through which mixing chamber communicate with the interior of the combustion chamber.

6. In a continuous tunnel kiln, the combination with an elongated kiln chamber and an elongated combustion chamber within the chamber and formed with an aperture in its bottom wall and a masonry platform on which said combustion chamber rests, said platform having a fuel channel formed in it which terminates in an open ended portion extending above the platform into said aperture.

7. A continuous tunnel kiln comprising in combination an elongated kiln chamber, an elongated combustion chamber comprising a bottom wall portion in the form of an open frame, a refractory hood seated on said frame and shaped to form a compartment in said combustion chamber which is open at its end adjacent one end of the combustion chamber but is closed at its opposite end and at its top, and a masonry support for said combustion chamber having air and gas supply channels formed in it which open at the top of the platform and communicate with said combustion chamber through said open frame.

8. A continuous tunnel kiln comprising in combination an elongated kiln chamber, an elongated combustion chamber comprising a elongated combustion chamber comprising a bottom wall portion in the form of an open frame and side wall portions resting on the sides of said frame and comprising vertically disposed tile sections formed with longitudinal open end circulation channels in communication at their upper ends with the kiln chamber and having ports formed through the outer walls of said channels adjacent their lower ends, and a masonry support for said combustion chamber having air and gas supply channels formed in it which open at the top of the platform and communicate with said combustion chamber through said open frame.

Signed at Detroit, in the county of Wayne and State of Michigan, this 26th day of April, A. D. 1920.

PHILIP d'H. DRESSLER.